United States Patent [19]

Teterwak

[11] Patent Number: 5,768,616
[45] Date of Patent: Jun. 16, 1998

[54] APPARATUS FOR DETECTING ELECTRO-MAGNETIC STYLUS SIGNALS BY INDUCING CURRENT INTO A PLURALITY OF SENSOR COILS USING SIGNALS TRANSMITTED BY THE TRANMITTER COIL OF THE STYLUS

[75] Inventor: Jerzy A. Teterwak, Colorado Springs, Colo.

[73] Assignee: Symbios, Inc., Fort Collins, Colo.

[21] Appl. No.: 573,211

[22] Filed: Dec. 13, 1995

[51] Int. Cl.$^6$ .................................................. G06F 13/00
[52] U.S. Cl. .......................... 395/825; 395/500; 395/821; 395/889; 395/893; 345/145; 345/156; 345/158; 345/173; 178/46; 178/114
[58] Field of Search .......................... 178/18, 46, 114; 345/173, 145, 156, 158; 364/571.04; 380/25; 395/825, 500, 821, 889, 893

[56] References Cited

U.S. PATENT DOCUMENTS

| | | | |
|---|---|---|---|
| 4,216,352 | 8/1980 | Chamuel | 178/19 |
| 4,686,332 | 8/1987 | Greanias et al. | 345/173 |
| 4,716,542 | 12/1987 | Peltz et al. | 364/900 |
| 4,745,565 | 5/1988 | Garwin et al. | 364/571.04 |
| 4,777,329 | 10/1988 | Mallicoat | 178/18 |
| 4,814,552 | 3/1989 | Stefik et al. | 178/18 |
| 5,007,085 | 4/1991 | Greanias et al. | 380/25 |
| 5,073,685 | 12/1991 | Kobayashi et al. | 178/18 |
| 5,247,261 | 9/1993 | Gershenfeld | 324/716 |
| 5,308,936 | 5/1994 | Biggs et al. | 178/18 |
| 5,381,160 | 1/1995 | Landmeier | 345/174 |
| 5,414,226 | 5/1995 | Matsushima | 178/18 |
| 5,466,895 | 11/1995 | Logan | 178/18 |
| 5,543,589 | 8/1996 | Buchana et al. | 178/18 |

FOREIGN PATENT DOCUMENTS

| | | | |
|---|---|---|---|
| 1073414 | 7/1989 | Japan | G06F 3/033 |
| 9202912 | 2/1992 | WIPO | G08C 19/16 |
| 9309529 | 5/1993 | WIPO | G09G 3/00 |

OTHER PUBLICATIONS

Utilisation d'une onde progressive de surface pour tableau graphique de grandes dimensions; S. Bigot et al.; Revue De Physique Appliquee; vol. 23, No. 7; Jul., 1988; pp. 1257–1263.

Research Disclosure; Ultrasonic Pen for Interactive Computing; No. 259; Nov., 1985; Havant GB; p. 25947 XP002027752.

*Primary Examiner*—Thomas C. Lee
*Assistant Examiner*—Po C. Huang
*Attorney, Agent, or Firm*—Paul J. Maginot; Wayne P. Bailey

[57] ABSTRACT

A method and apparatus for detecting the presence of a stylus relative to an active area of a display screen. The method includes the steps of providing a number of sensors which are positioned to define a boundary surrounding an active area of the display screen, and transmitting an electromagnetic signal from the stylus to the sensors wherein the signal is indicative of the presence of the stylus relative to the active area.

19 Claims, 2 Drawing Sheets

5,768,616

APPARATUS FOR DETECTING ELECTRO-MAGNETIC STYLUS SIGNALS BY INDUCING CURRENT INTO A PLURALITY OF SENSOR COILS USING SIGNALS TRANSMITTED BY THE TRANMITTER COIL OF THE STYLUS

BACKGROUND OF THE INVENTION

The present invention relates generally to digitizers, and more particularly to a digitizer having corner sensors for detecting an electromagnetic stylus signal.

Digitizers or digitizing tablets for use as data input devices for notebook or pen-based computers are known. Some prior art digitizing tablets utilize a transparent digitizing grid system which is typically disposed on a substrate such as glass positioned over the surface of a Liquid Crystal Display (LCD) screen, to sense the coordinate position of a stylus device that is moved across the grid system. Regardless of the transparency of the digitizing grid system, the user of such a prior art device must view the LCD display screen through the grid structure of the digitizing tablet. While the grid structure is typically of film thickness, the edges of the transparent conductive runs may still be seen to some slight degree at certain times and under certain conditions.

Other known digitizing tablets utilize a magnetic coil grid built on the surface of a printed circuit board which is typically placed under an LCD display. To improve the performance of a digitizing tablet which utilizes a grid system under the LCD display, a magnetic shield is added to the lower side of the grid. In this solution, the position of a stylus is determined based on the interaction between the grid coils and a coil mounted on the pen. Since the stylus and the grid are separated by the LCD display, the interaction between the stylus and grid is reduced and the accuracy of the system is also reduced. In addition, the grid and the shield add a significant thickness and weight to the digitizing tablet.

What is needed therefore is a digitizing tablet which eliminates the problems associated with a transparent grid system positioned over an LCD display screen, and which eliminates the problems associated with an electro-magnetic coil grid positioned under an LCD display screen.

SUMMARY OF THE INVENTION

In accordance with one aspect of the present invention, there is provided method for detecting the presence of a stylus relative to an active area of a display screen. The method includes the steps of providing a number of sensors which are positioned to define a boundary surrounding an active area of the display screen, and transmitting a signal from the stylus to the sensors wherein the signal is indicative of the presence of the stylus relative to the active area.

Pursuant to a second aspect of the present invention, there is provided a digitizer for a pen-based computer having a display screen secured to a housing. The digitizer includes a number of sensors secured to the housing and positioned so as to define a boundary surrounding an active area of the display screen, and a stylus for transmitting a signal to the sensors wherein the signal is indicative of the presence of the stylus relative to the active area.

Pursuant to a third aspect of the invention, there is provided a pen-based computer including a housing, a display screen secured to the housing and having an active area, a number of sensors secured to the housing and positioned so as to define a boundary surrounding an active area of the display screen, and a stylus for transmitting a signal to the sensors wherein the signal is indicative of the presence of the stylus relative to the active area.

It is therefore an object of the present invention to provide a new and useful method for sensing a stylus with an electromagnetic digitizer.

It is another object of the present invention to provide an improved digitizer where an active area of a display screen does not contain sensor components.

It is a further object of the present invention to provide a new and useful digitizer having sensors positioned in the corners of a display screen housing.

It is still another object of the present invention to provide a new and useful digitizer which has the advantages of an electrostatic tablet being transparent, thin and not requiring any components above or below a display screen, and at the same time has the advantage of an electromagnetic digitizing tablet being insensitive to the presence of a user's hand.

The above and other objects, features, and advantages of the present invention will become apparent from the following description and the attached drawings.

DETAILED DESCRIPTION OF THE PREFERRED EMBODIMENT

Figure 1:
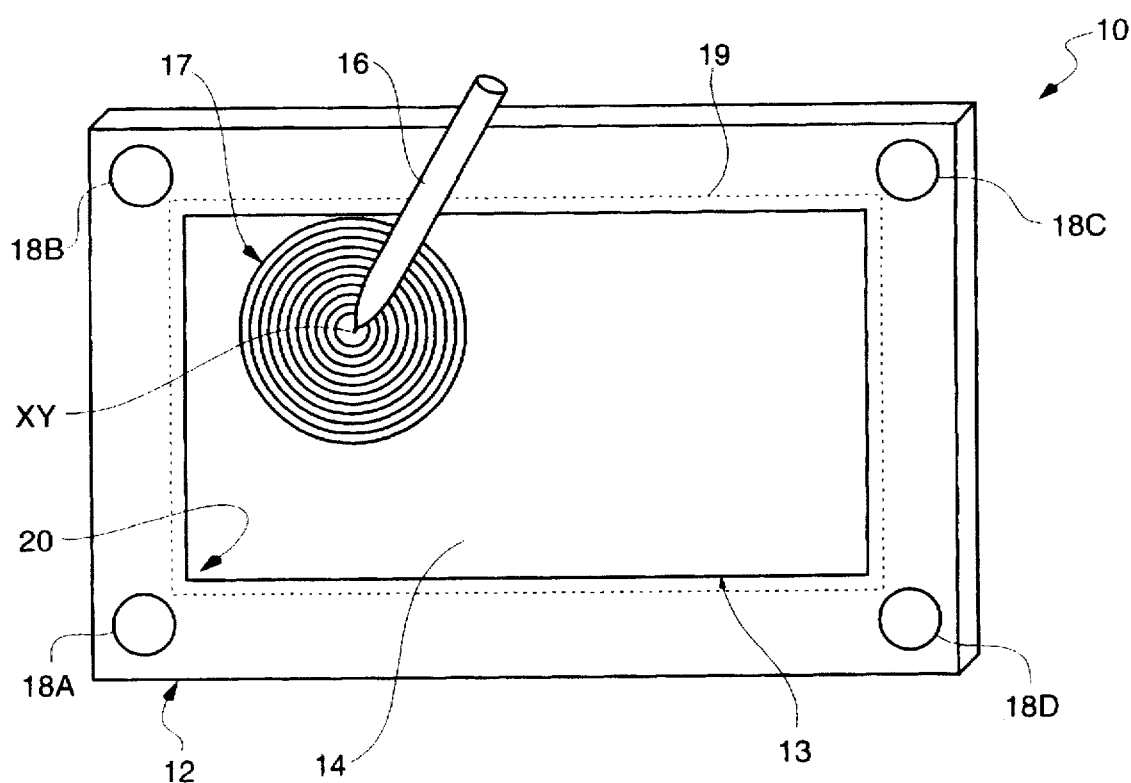
FIG. 1 is a plan view of a pen-based computer having a digitizer which incorporates the features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring now to FIG. 1, there is shown a pen-based computer 10 such as a notebook computer, which incorporates the features of the present invention therein. The computer 10 includes a base or frame 12 having a display screen 13 such as a Liquid Crystal Display (LCD) screen mounted thereto. An active area 14 of the display screen 13 conventionally displays text, data and/or graphics that may be input into the computer 10 from a pen or stylus 16. What is meant hereinafter by the term "active area" is a portion of the display screen 13 that includes addressable pixels for input and/or display purposes.

The computer 10 also includes a number of sensors such as sensor coils 18 mounted to the frame 12. In the embodiment being described, there are four sensor coils 18a–18d, each of which is arranged in a respective corner of the frame 12. More particularly, the sensor coils 18a–18d are positioned so as to define an imaginary boundary 19 which encloses or surrounds the active area 14 of the display screen 13. However, it should be appreciated that, depending upon the size and position of the active area 14 relative to the display screen 13, the coils 18a–18d may be positioned at locations other than the corners of the frame 12. Thus, as long as the sensor coils cooperate to define a boundary surrounding an active area, the sensor coils may be mounted to the frame at any location.

The sensor coils 18a–18d receive an electromagnetic signal 17 that is transmitted from the stylus 16 as described further below. It should be appreciated that the signal 17 radiates uniformly outwardly from the stylus 16 as shown in FIG. 1. The stylus 16, sensor coils 18a–18d and a controller 27 (discussed further below) cooperate to define a digitizer for inputting data such as stylus position data, into the computer 10. That is, the digitizer facilitates the determination of the Cartesian coordinates (X, Y) which represent the position of the stylus 16 relative to an origin 20 which is arbitrarily positioned in the lower left-hand corner of the active area 14.

Figure 2:
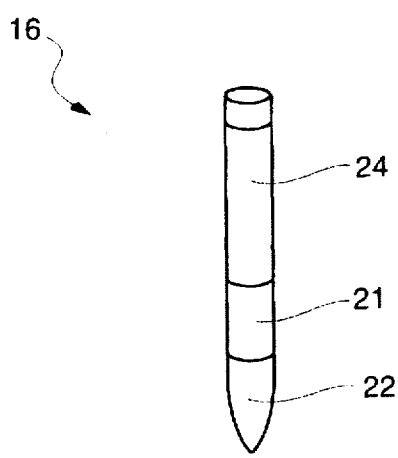
FIG. 2 is a perspective view of a stylus associated with the digitizer shown in FIG. 1.

In the embodiment being described, the stylus 16 is a cordless-type stylus having at least an oscillator portion 21, transmitter portion 22 and battery portion 24 as shown in FIG. 2. The battery portion 24 supplies power to the oscillator portion 21 which then stimulates a coil (not shown) associated with the transmitter portion 22, to transmit the signal 17 from the stylus 16 to the sensor coils 18a–18d.

Figure 3:
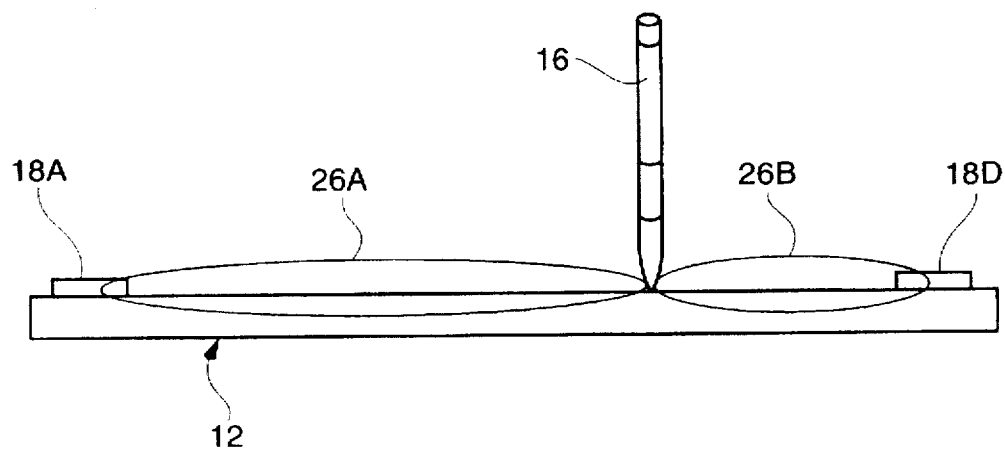
FIG. 3 is a side elevation view of the pen-based computer shown in FIG. 1.

The signal 17 is transmitted from the stylus 16 to the sensor coils 18a–18d by means of an electromagnetic coupling between the transmitter coil associated with the transmitter portion 22, and each of the sensor coils 18a–18d as shown by the electromagnetic lines of flux 26a, 26b in FIG. 3. In the embodiment being described, the signal transmitted from the stylus 16 has a frequency of approximately 125 KHz.

It should be appreciated that the interaction between the stylus 16 and the respective sensor coils 18a–18d is similar to the interaction between the primary and secondary coils of a conventional transformer. Thus, the extent of electromagnetic coupling between the stylus 16 and the respective sensor coils 18a–18d is a function of the distance between the stylus 16 and the respective sensor coils 18a–18d. Hence, the closer the stylus 16 is to a particular sensor coil 18a–18d, the greater the electromagnetic coupling between the stylus 16 and that sensor coil 18a–18d, and the greater the signal strength, i.e. amplitude of the signal received by that sensor coil 18a–18d.

Figure 4:
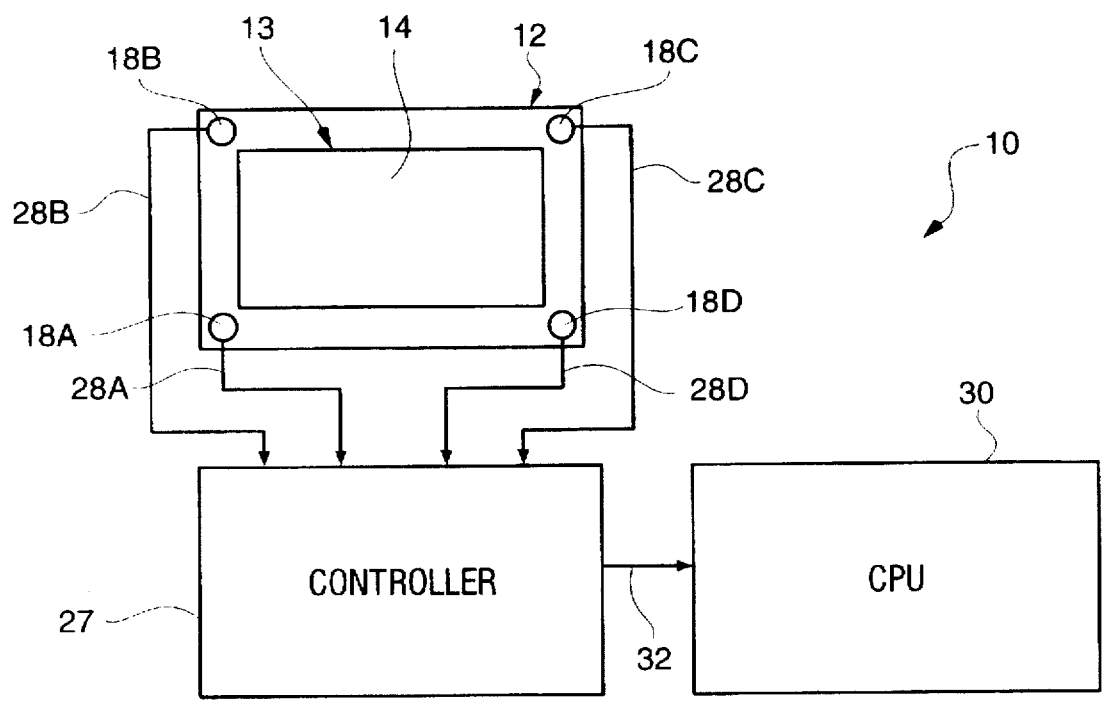
FIG. 4 is a functional block diagram of the pen-based computer shown in FIG. 1.

Referring now to FIG. 4, a controller 27 interfaces the digitizer to a CPU 30 of the computer 10. In particular, each of the sensor coils 18a–18d is operatively connected to the controller 27 through a separate channel 28a–28d, respectively. The controller 27 is operatively connected to the CPU 30 through a serial port 32.

In operation, the transmitted signal from the stylus 16 induces a current into each of the four sensor coils 18a–18d. The induced currents are coupled to the controller 27 through the respective channels 28a–28d. The controller 27 converts the induced currents into voltage signals which are then amplified in a frequency selective manner prior to being converted to digital (binary) values indicative of the amplitude of the transmitted signal received at the particular sensor coils 18a–18d.

The controller 27 determines the X, Y coordinate position of the stylus 16 based on a ratio of the signal amplitudes received at the sensor coils 18a–18d. More particularly, the signal amplitude received at each sensor coil 18a–18d is inversely proportional to the third power of the distance separating the stylus 16 from the respective sensor coils 18a–18d. Since the X, Y coordinate computations are based on a ratio of the received signal amplitudes, the computations are independent of the absolute signal amplitude received at each sensor coil 18a–18d. The controller 27 sends the calculated X, Y coordinate position of the stylus 16 to the CPU 30 for conventional processing via the serial port 32.

The digitizer of the present invention has the advantage of known electrostatic digitizer tablets in that it is transparent, thin and does not require any components under the display screen 13, and at the same time has the advantage of known electromagnetic digitizer tablets in that it is insensitive to the presence of a user's hand.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

It should be appreciated that the stylus 16 may also transmit digital information to the computer 10 through a repeating telemetry message which may be modulated onto the stylus 16 carrier signal via frequency modulation (FM). The telemetry information may be extracted from the transmitted signal and packaged along with the stylus X, Y coordinate data into a packet by the controller 27 for further processing by the CPU 30.

It should also be appreciated that the active area 14 of the display screen 13 has no sensor components associated therewith, i.e. no sensor components are positioned above or below the LCD screen, thus eliminating the problems associated with conductive grids used in the prior art.

In addition, the sensor coils 18a–18d may be formed from conventional materials in a known manner to perform in accordance with a particular digitizer application, in terms of the shape and dimensions of the frame 12, and the controller 27 characteristics.

It should also be appreciated that the stylus 16 may be a tethered-type wherein the stylus 16 contains a transmitter portion which is powered by a separate driver unit that is coupled to the stylus via a supply cord.

What is claimed is:

1. A method for detecting position of a stylus relative to an active area of a display screen of a computer system, with (1) the stylus having a transmitter coil, and (2) the computer system having a plurality of sensor coils which are positioned to define a boundary surrounding the active area of the display screen, comprising the steps of:

stimulating the transmitter coil of the stylus so that the transmitter coil generates an electromagnetic signal;

inducing current in the plurality of sensor coils in response to the stimulating step; and determining position of the stylus relative to the active area based on current induced in the plurality of sensor coils in the inducing step.

2. The method of claim 1, wherein:

the display screen is secured to a housing, and each of the plurality of sensor coils is secured to the housing.

3. The method of claim 1, wherein:

the plurality of sensor coils includes four sensor coils which are positioned to define the boundary which surrounds the active area of the display screen, and the boundary defines a substantially rectangular shape having four corners.

4. The method of claim 3, wherein:

each of said four corners of said boundary has a respective sensor coil of said four sensor coils positioned adjacent thereto.

5. The method of claim 1, wherein each of the plurality of sensor coils is spaced apart from the active area of the display screen.

6. The method of claim 1, wherein the stylus is a cordless stylus.

7. The method of claim 1, wherein the stylus is tethered to the computer.

8. A computer, comprising:

a housing;

a display screen secured to said housing and having an active area;

a stylus having a transmitter coil which generates an electromagnetic signal when stimulated;

a plurality of sensor coils secured to said housing and positioned (1) to define a boundary surrounding said active area of said display screen, and (2) to receive said electromagnetic signal which induces current in said plurality of sensor coils; and a circuit which determines position of said stylus relative to said active area based on current induced in said plurality of sensor coils.

9. The computer of claim 8, wherein:

said plurality of sensor coils includes four sensor coils which are positioned to define said boundary which surrounds said active area of said display screen, and said boundary defines a substantially rectangular shape having four corners.

10. The method of claim 9, wherein:

each of said four corners of said boundary has a respective sensor coil of said four sensor coils positioned adjacent thereto.

11. The method of claim 8, wherein each of said plurality of sensor coils is spaced apart from said active area of said display screen.

12. The method of claim 8, wherein said stylus is a cordless stylus.

13. The method of claim 8, wherein said stylus is tethered to said computer.

14. A digitizer for a pen-based computer having a display screen secured to a housing, the digitizer comprising:

a stylus having a transmitter coil which generates an electromagnetic signal when stimulated;

a plurality of sensor coils secured to said housing and positioned (1) to define a boundary surrounding an active area of said display screen, and (2) to receive said electromagnetic signal which induces current in said plurality of sensor coils; and a circuit which determines position of said stylus relative to said active area based on current induced in said plurality of sensor coils.

15. The digitizer of claim 14, wherein:

said plurality of sensor coils includes four sensor coils which are positioned to define said boundary which surrounds said active area of said display screen, and said boundary defines a substantially rectangular shape having four corners.

16. The digitizer of claim 15, wherein:

each of said four corners of said boundary has a respective sensor coil of said four sensor coils positioned adjacent thereto.

17. The digitizer of claim 14, wherein each of said plurality of sensor coils is spaced apart from said active area of said display screen.

18. The digitizer of claim 14, wherein said stylus is a cordless stylus.

19. The digitizer of claim 14, wherein said stylus is tethered to said computer.

* * * * *